(12) United States Patent
Hockema et al.

(10) Patent No.: US 8,350,719 B2
(45) Date of Patent: Jan. 8, 2013

(54) LID PLUG AND BRACKET

(75) Inventors: Steven W. Hockema, Fort Wayne, IN (US); Mark E. Anderson, Huntington, IN (US)

(73) Assignee: The Ford Meter Box Company, Inc., Wabash, IN (US)

( * ) Notice: Subject to any disclaimer, the term of this patent is extended or adjusted under 35 U.S.C. 154(b) by 113 days.

(21) Appl. No.: 12/825,663

(22) Filed: Jun. 29, 2010

(65) Prior Publication Data

US 2011/0006182 A1    Jan. 13, 2011

Related U.S. Application Data

(60) Provisional application No. 61/224,974, filed on Jul. 13, 2009.

(51) Int. Cl.
*G08B 23/00* (2006.01)

(52) U.S. Cl. ............... 340/870.02; 248/200; 248/309.1; 248/354.6; 343/719

(58) Field of Classification Search ............... 340/870.2; 343/719; 439/277; 248/200, 300, 220.21, 248/220.31, 354.6
See application file for complete search history.

(56) References Cited

U.S. PATENT DOCUMENTS

| | | | |
|---|---|---|---|
| 5,825,303 | A | 10/1998 | Bloss, Jr. et al. |
| D406,541 | S | 3/1999 | Lehmann et al. |
| 5,877,703 | A | 3/1999 | Bloss, Jr. et al. |
| 6,218,995 | B1 | 4/2001 | Higgins et al. |
| 6,300,907 | B1 | 10/2001 | Lazar et al. |
| 6,378,817 | B1 | 4/2002 | Bublitz et al. |
| 6,851,567 | B2 | 2/2005 | McKinnon |
| 6,954,144 | B1 | 10/2005 | Kiser et al. |
| 7,278,765 | B2 | 10/2007 | Cooper et al. |
| 7,429,933 | B2 | 9/2008 | Brennan et al. |
| 7,446,672 | B2 | 11/2008 | Johnson et al. |
| 2002/0089428 | A1 | 7/2002 | Walden et al. |
| 2004/0196159 | A1 | 10/2004 | Brennan et al. |

OTHER PUBLICATIONS

The Ford Meter Box Company, Inc.; PTP/PTP-BR Product Release; Jun. 2010.

*Primary Examiner* — Amy J Sterling
(74) *Attorney, Agent, or Firm* — Barnes & Thornburg LLP

(57) ABSTRACT

A meter pit lid plug and bracket assembly configured to suspend a transmitter plug inside a meter pit is provide. The meter pit lid plug and bracket assembly includes a plug and a bracket. The plug includes a head and a stem that extends from the head. The stem is also configured to extend through a hole in a meter pit having a top surface. The head is sized to rest on the top surface of the meter pit lid and is configured to hold the stem in the hole. The bracket is configured to hold the transmitter plug inside the meter pit. The stem is selectively engageable with the base so that when the stem is connected with the base, both the plug and bracket are configured to hold and suspend the transmitter plug inside the meter box.

4 Claims, 7 Drawing Sheets

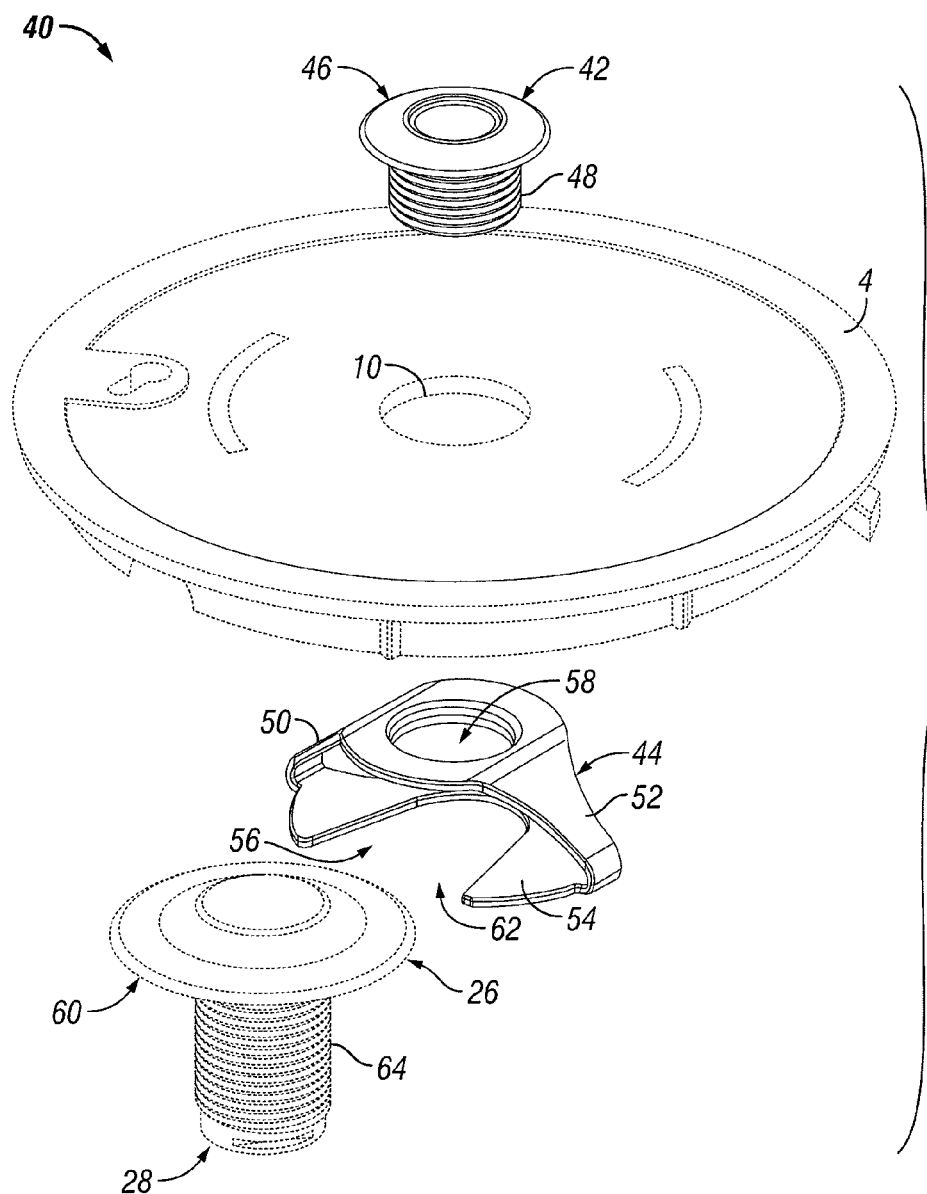

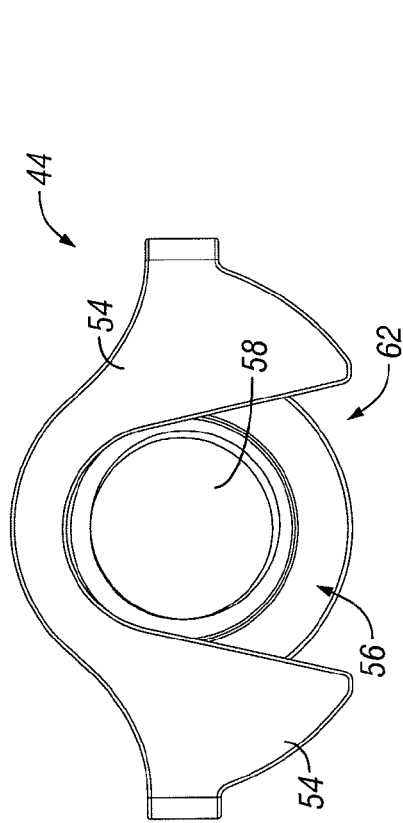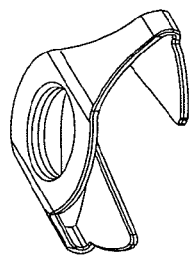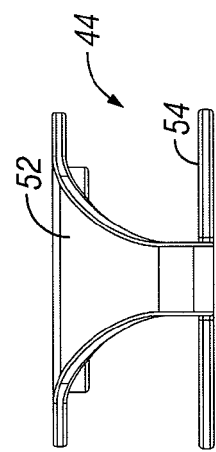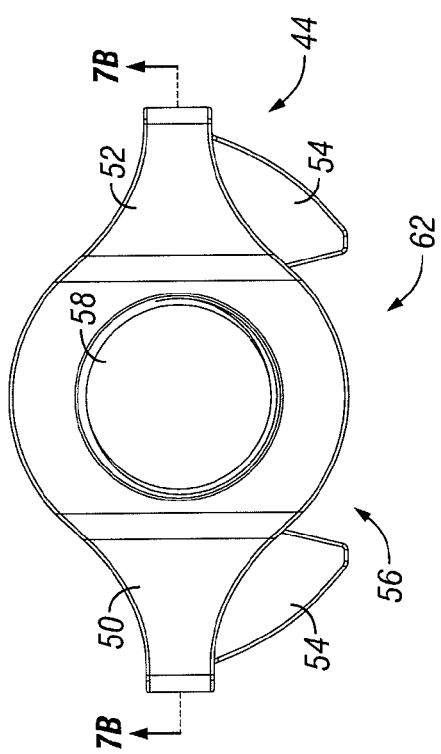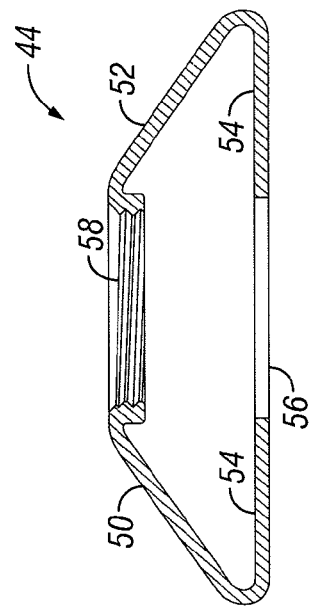

LID PLUG AND BRACKET

RELATED APPLICATIONS

The present application is related to and claims priority to U.S. Provisional Patent Application Ser. No. 61/224,974, filed on Jul. 13, 2009, entitled "Lid Plug and Bracket." The subject matter disclosed in that provisional application is hereby expressly incorporated into the present application.

TECHNICAL FIELD AND SUMMARY

The present disclosure is related to monitoring transmitters used in subsurface meter pits. In particular, this present disclosure relates to a bracket that holds a transmitter or transmitting antenna housings inside a meter enclosure commonly referred to as a meter pit or meter box.

In order to track and quantify the water flowing into a building or home (collectively referred to as "dwelling"), a meter is attached outside the dwelling between it and the water supply. The meter measures the amount of water entering the dwelling. After a certain interval of time, the amount of water used is reported to the water utility and a bill is issued to the user.

These meters are often located below ground surface in pits outside the dwelling. Traditionally, each meter was manually read and recorded at the meter's site. Installing the meter below ground prevents it from freezing in cold weather. A lid, most commonly made from cast iron and more recently made from plastic, covers the pit. It protects the meter from the elements and is removable, so the meter can be read and/or serviced.

In an effort to reduce the expense of the manpower required to read all the meters, electronic transmitters have recently been developed to electronically send meter readings to a central location. The bills can then be generated automatically. Problems exist using these transmitters, however, since they are located below ground surface in a covered pit. Effectively transmitting a signal through the lid can be difficult and is prone to failure. This is because the cast iron lids are not particularly conducive to penetrating radio waves. One solution is a hole drilled in the lid that receives a transmitter plug which extends up through the hole. Examples of such plugs or housing can be found in U.S. Pat. Nos. 7,446,672; 6,378,817; 7,429,933; and 6,300,907, the disclosures of which are herein incorporated by reference. A typical transmitter plug contains either a transmitter or an antenna for transmitting signals unobstructed by the cast iron in the lid. The problem with this is that these plugs actually house either the antennas or the delicate transmitters. Damaging the plug could damage the antenna or transmitter. This can happen because these plugs extend up from the surface of the lid. They are, therefore, subject to damage from lawnmowers, snow and ice removal blades, vandalism, and elements. This results in expensive repair.

An illustrative embodiment of this present disclosure provides a bracket assembly that is attachable to the lid and is configured to receive a transmitter or antenna plug. In one embodiment, a bracket plug is disposed in the same hole used by the antenna or transmitter plugs. In contrast, however, a bracket attaches to the plug and suspends the antenna or transmitter plug under the lid. Suspending the antenna or transmitter plugs under the surface of the lid reduces their propensity for damage while still receiving the benefit of not having the cast iron lid interfering with the transmission signals.

Another embodiment of the present disclosure provides a meter pit lid plug and bracket assembly configured to suspend a transmitter plug inside a meter pit. The meter pit lid plug and bracket assembly comprises a plug and a bracket. The plug includes a head and a stem that extends from the head. The stem is also configured to extend through a hole in a meter pit having a top surface. The head is sized to rest on the top surface of the meter pit lid and is configured to hold the stem in the hole. The bracket is configured to hold the transmitter plug inside the meter pit. The bracket includes a base that is selectively fastenable to the stem and first and second arms that both extend and depend from opposing sides of the base. A plate is coupled to the first and second arms forming a space between itself, the arms and the base. This space is sized to receive a first portion of the transmitter plug. The plate also includes a surface and a slot. The slot is sized to selectively receive a second portion of the transmitter plug such that the surface of the plate surrounding the slot is sized to support the first portion of the transmitter plug. The stem is selectively engageable with the base so that when the stem is connected with the base, both the plug and bracket are configured to hold and suspend the transmitter plug inside the meter box.

In the above and other illustrative embodiments, the meter pit lid plug and bracket assembly my further comprise: the plug head and bracket base configured to sandwich the meter pit lid in between when the plug stem selectively fastens to the base; the notch having an open end configured to receive the second portion of the transmitter plug by sliding the transmitter plug into the notch to rest on the plate surrounding the notch; and the plug stem being threaded and the bracket base having a threaded hole disposed there through, and the threaded stem being selectively engageable with the threaded hole of the base to fasten the plug and bracket together.

Additional features and advantages of the bracket assembly will become apparent to those skilled in the art upon consideration of the following detailed descriptions exemplifying the best mode of carrying out the bracket assembly as presently perceived.

BRIEF DESCRIPTION OF DRAWINGS

The present disclosure will be described hereafter with reference to the attached drawings which are given as non-limiting examples only, in which:

FIG. 5 is an exploded view of a bracket assembly with a transmitter plug, and lid;

FIGS. 7a-e are top, side cross-sectional, end, bottom, and perspective views of a transmitter plug bracket.

Corresponding reference characters indicate corresponding parts throughout the several views. The exemplification set out herein illustrates embodiments of the lid plug and bracket and such exemplification is not to be construed as limiting the scope of the lid plug and bracket in any manner.

DETAILED DESCRIPTION OF THE DRAWINGS

Figure 1:
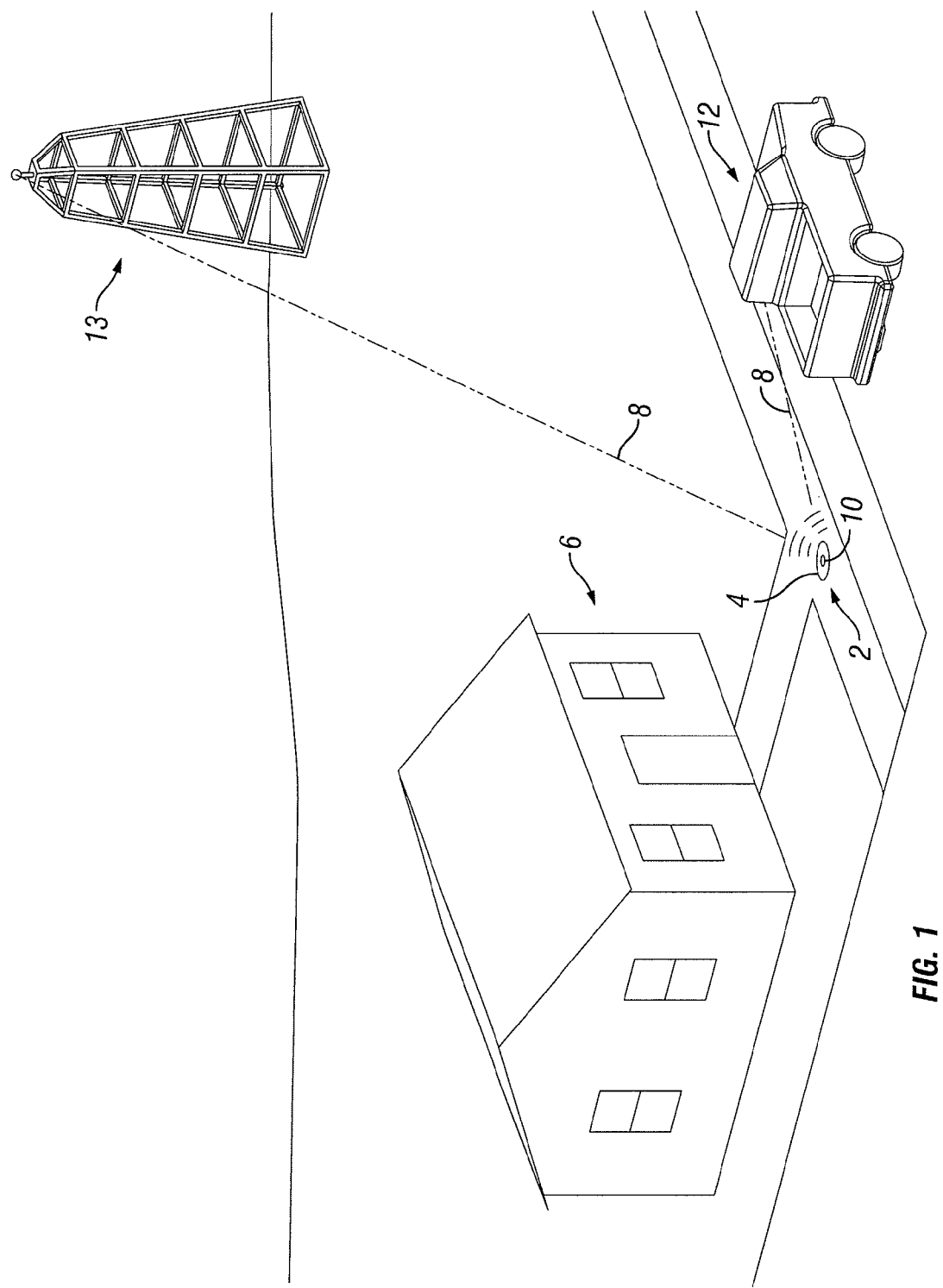
FIG. 1 is a perspective view demonstrating the utility of transmitter meter readings from a subsurface meter pit.

An illustrative perspective view demonstrating the utility of transmitting meter readings from a subsurface meter pit is shown in FIG. 1, This view shows pit 2 covered by lid 4 in proximity to dwelling 6. Inside pit 2 (see, also, FIG. 2) is a meter that records how much water is being supplied to dwelling 6. Signals 8 are generated from a meter transmitter sent out through hole 10 in lid 4. The signals can then be picked up either by a mobile receiver in a vehicle 12 or a fixed receiver such as that on a transmission tower 13.

Figure 2:
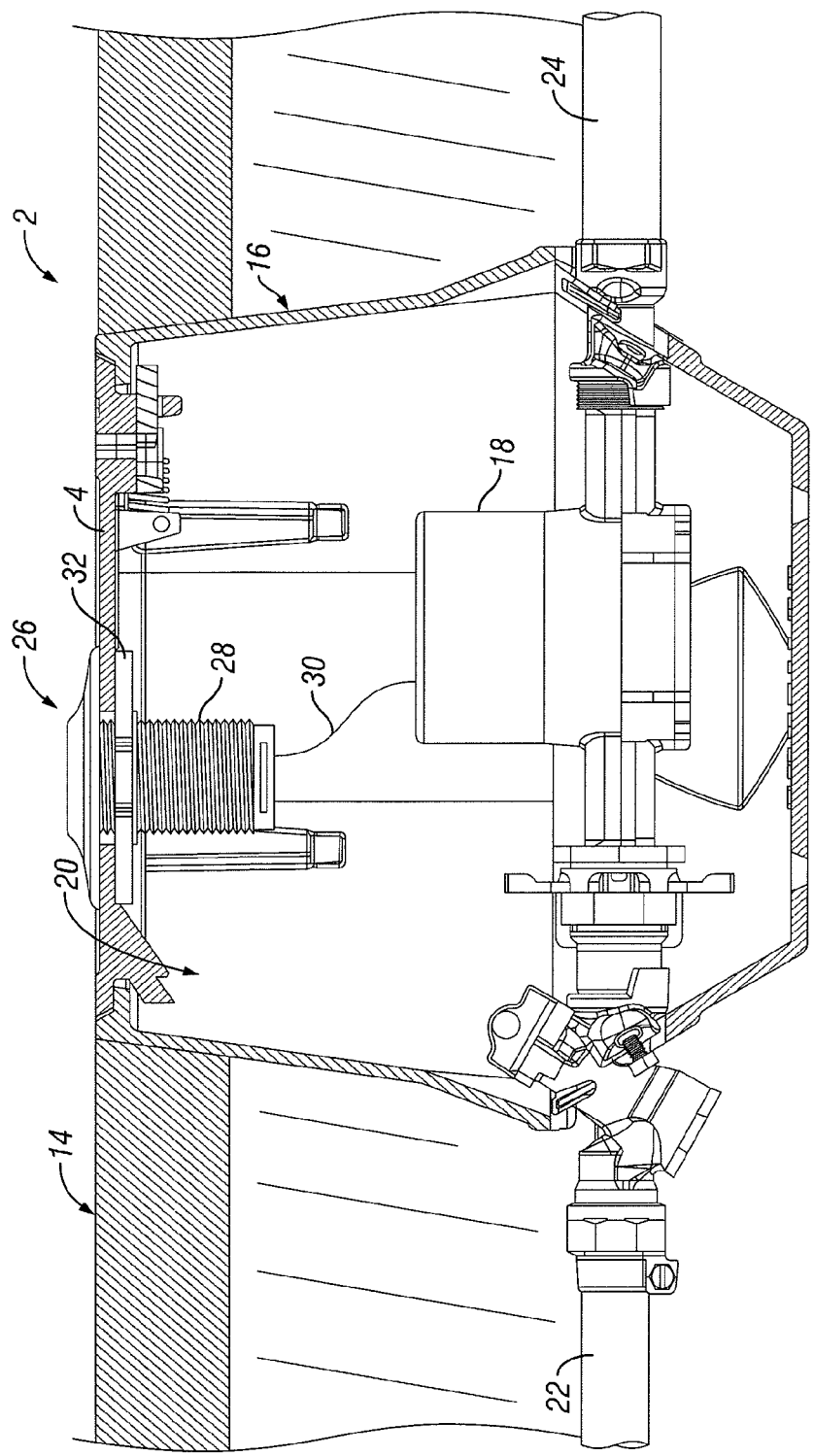
FIG. 2 is a prior art cross-sectional view of a meter box or pit installed below ground surface with a meter located therein and a transmitter plug coupled to the pit's lid.

A cross-sectional view of meter box or pit 2 installed below ground surface 14 is shown in FIG. 2. A meter 18 is positioned within cavity 20 of meter box 16 to meter water or other fluid flowing through pipes 22 and 24. A transmitter plug 26 is disposed through hole 10 of lid 4. A transmitter can be housed either inside threaded portion 28 of plug 26 or attached thereto. Alternatively, the transmitter can be placed in a separate location and tethered to plug 26. Still alternatively, if the transmitter is not located inside plug 26, an antenna can run inside plug 26. The location of the transmitter can be anywhere inside the pit as long as it is to transmit a signal through the lid.

In the illustrated embodiment, a tethered line 30 runs between meter 18 and transmitter plug 26. These plugs 26 are typically made from a plastic that does not so inhibit the signal generated by the transmitter. This is why either the transmitter itself or the antenna is located at hole 10. A typical cast iron lid otherwise inhibits signal transmissions. In this illustrative embodiment, plug 26 is secured to lid 4 using collar 32 having mating threads to portion 28. Because these sophisticated electronics are typically housed in a transmitter plug, any damage to the plug may impair its ability to operate properly and result in costly repairs. Since the typical transmitter plug extends above the lid level, damage may come not only from the elements, but from lawn equipment such as lawnmowers, trimmers, snow and ice removal blades, and vandalism.

Figure 3:
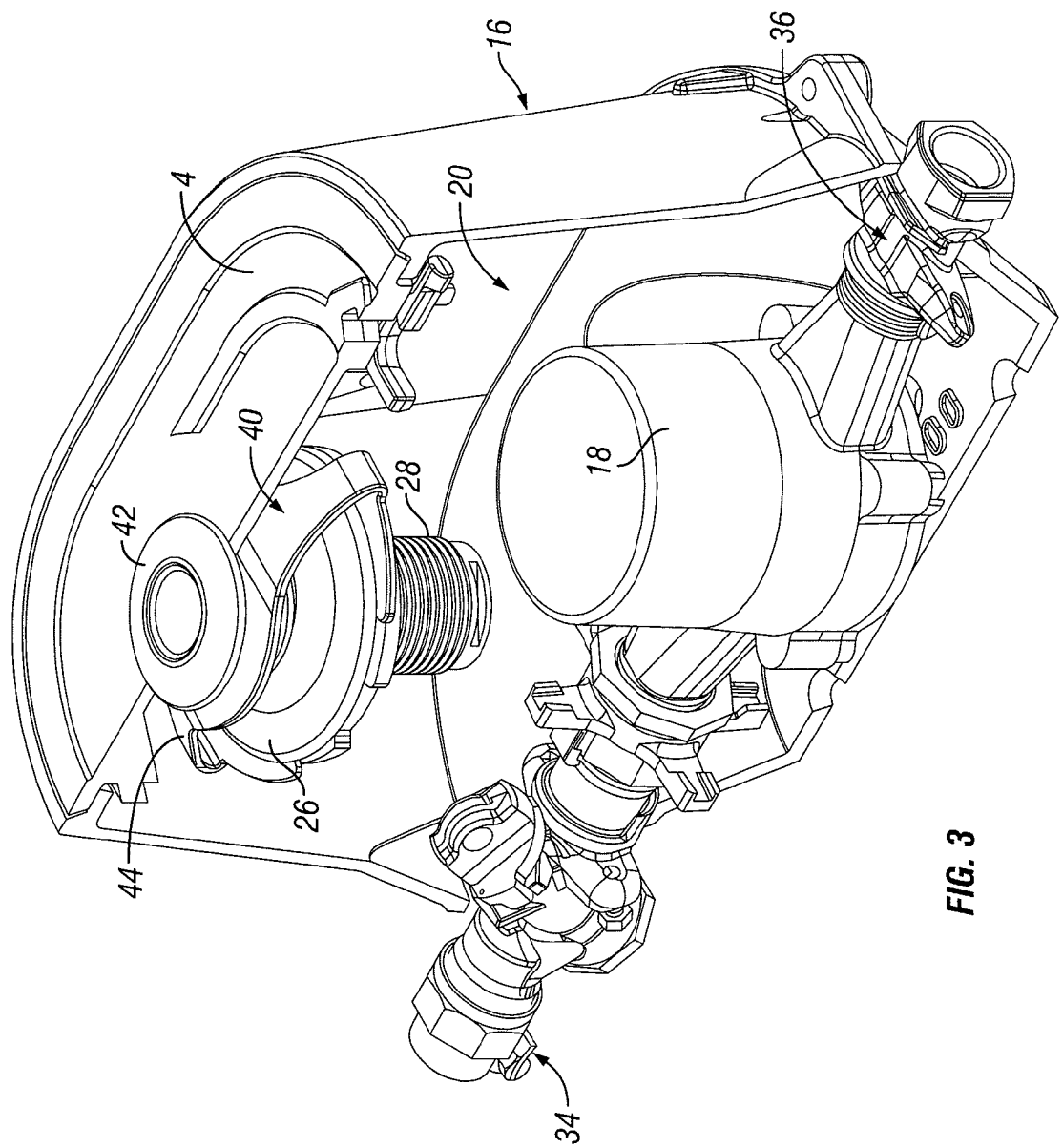
FIG. 3 is a perspective cutaway view of a meter box with a bracket assembly according to the present disclosure holding a plug beneath the surface of the lid.

A perspective cutaway view of meter box 16 is shown in FIG. 3. To mitigate exposure to damage of plug 26, bracket assembly 40 holds plug 26 under hole 10, beneath the surface of lid 4. This allows the signals from the transmitter to exit just as it would if attached directly to hole 10, but reduces the risk of damage to plug 26 because it is kept entirely in cavity 20 of meter box 16. As shown in this view, a typical pit housing meter 18 has sufficient space to also house a typical transmitter plug. It is appreciated, however, that other configurations of pits can be used and still employ bracket assembly 40. This view further shows connector assemblies 34 and 36 that couple meter 18 to pipes 22 and 24, respectively.

As shown in this illustrative embodiment, a bracket plug 42 supported by lid 4 and disposed through hole 10 (see, also, FIG. 4), holds and suspends bracket 44 inside cavity 20. Bracket 44 also secures to plug 26 suspending it inside cavity 20.

Figure 4:
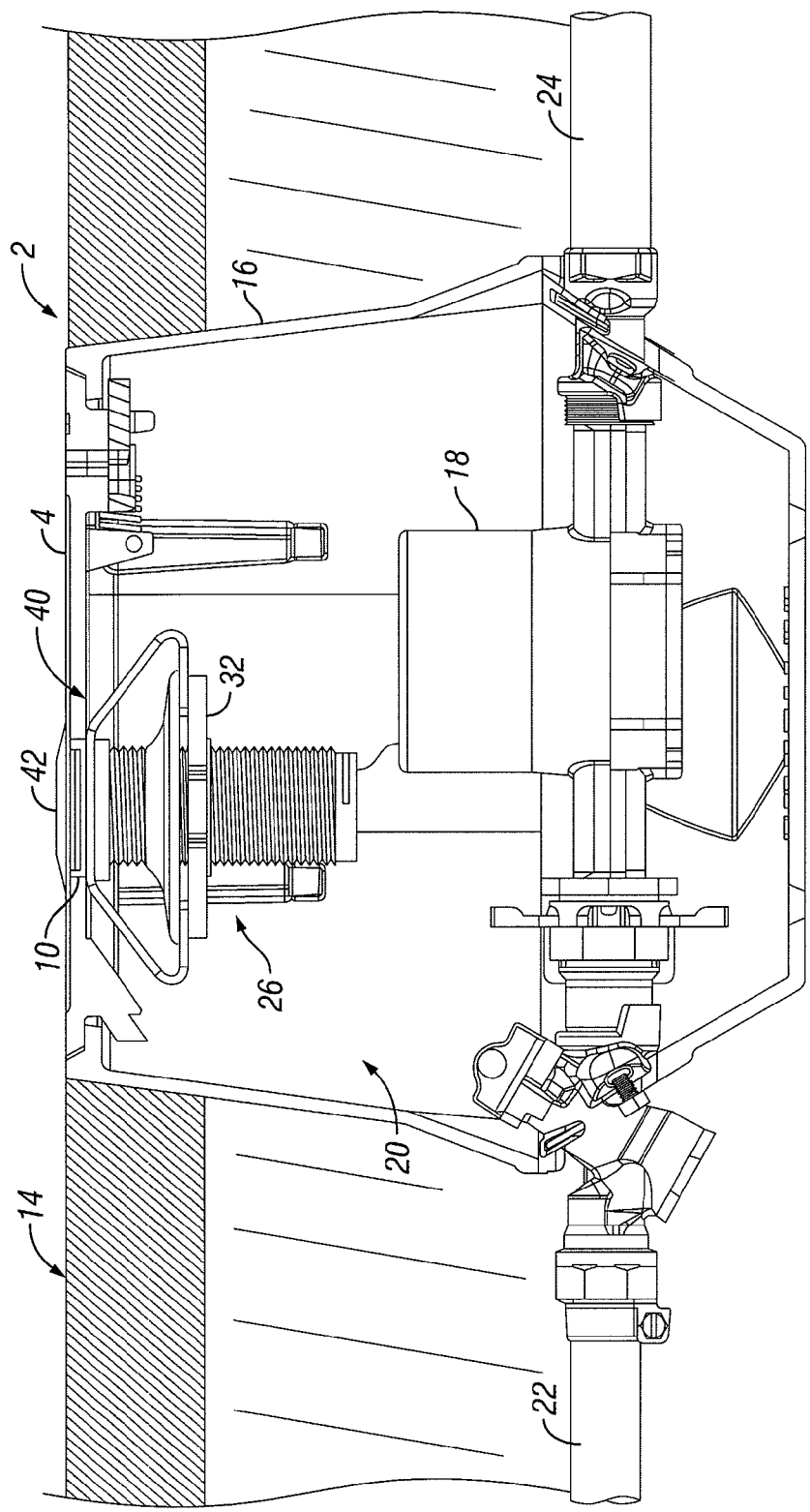
FIG. 4 is a cross-sectional view of a meter pit installed below ground surface with a bracket assembly supporting a transmitter plug inside the pit.

A cross-sectional view of meter pit 2 installed below ground surface 14 with bracket assembly 40 supporting transmitter plug 26 inside cavity 20 below lid 4 is shown in FIG. 4. Meter 18 is still positioned within cavity 20 of meter box 16 metering fluid flowing through pipes 22 and 24. Transmitter plug 26 is suspended within cavity 20, yet is still aligned with hole 10 in lid 4. Plug 42 is disposed through hole 10 and illustratively threaded onto bracket 44 underneath lid 4. This view also shows collar 32 screwed onto plug 26 helping secure it to bracket 44.

Again, transmitter plug 26 can be configured to house the actual transmitter, attach to a separate transmitter, or receive the antenna of a remote transmitter. All will work with bracket assembly 40 as it maintains the transmission path out of lid 4 for any of these configurations.

An exploded view of bracket assembly 40 is shown in FIG. 5. Also included is lid 4 and transmitter plug 26. Assembly 40 includes plug 42 having a head 46 and stem 48. In this illustrative embodiment, stem 48 is threaded. Bracket 44 includes illustrative depending arms 50 and 52 that connect to a plate 54 having slot 56 disposed therein. The threaded stem 48 is disposed in hole 10 of lid 4 and threaded hole 58 in bracket 44. The mating threads between stem 48 and hole 58 sandwich lid 4 between plug 42 and bracket 44. This is also how plug assembly 40 secures itself to lid 4. Head 60 of plug 26 can illustratively slide into open end 62 of slot 56 resting on plate 54 while threaded stem 64 extends therebelow. Plate 54 is so configured such that collar 32 (see FIG. 2) engages plate 54 sandwiching it between head 60 and collar 32. (See FIG. 4.) It is appreciated that other fastening means can be used to secure bracket 44 to lid 4 and/or to plug 26 including fasteners, adhesives, friction fit, detents, and clasps, for example. After reading this description, one skilled in the art will understand how to employ these fastening means.

Figure 6B:
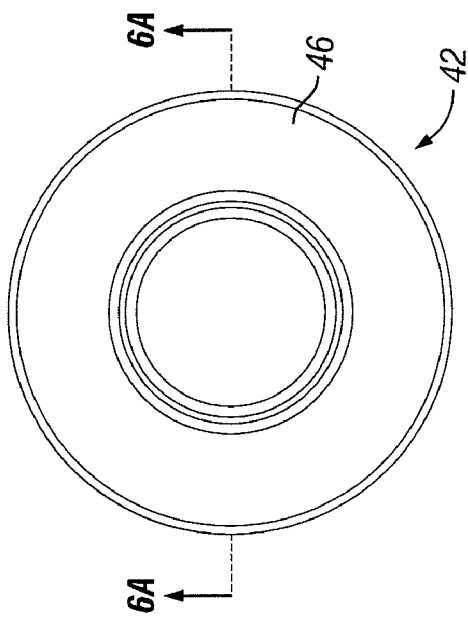
FIGS. 6a-c are perspective top and cross-sectional side views of a plug.
Figure 6A:
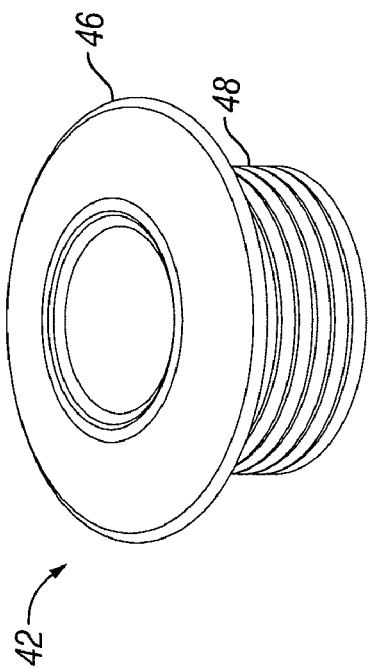
Figure 6C:
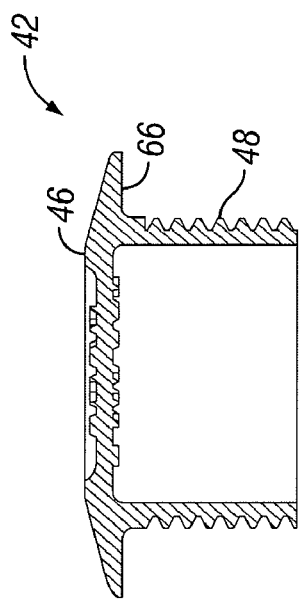

Perspective top and side cross-sectional views of plug 42 are shown in FIGS. 6a-c. The view shown in FIG. 6a includes stem 48 and head 46. The view shown in FIGS. 6b and c illustrates how head 46 creates a flange 66 around the periphery of plug 42 that rests on lid 4. Also shown in this view are the illustrative threads on stem 48.

Top, bottom and side cross-sectional, and perspective views of bracket 44 are shown in FIGS. 7a through d. It is appreciated that the dimensions shown in these views are illustrative only and one skilled in the art after reading these descriptions and dimensions will be able to modify the bracket assembly. Such modification is not outside the contemplated scope of this disclosure. The top view shown in FIG. 7a shows threaded hole 58 bound by arms 50 and 52. Plate 54 bounds opening 62 of slot 56. The cross-sectional view in FIG. 7b illustratively shows how the components are integrated into one another. For example, hole 58 is formed from extending arms 50 and 52 which depend downward and curve inward to form plate 54 which is notched out forming slot 56. It is appreciated that alternate configurations of bracket 44 can be constructed to hold transmitter plug 26 below lid 4 without departing from the teachings disclosed herein.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:
1. A meter pit lid plug and bracket assembly configured to suspend a transmitter plug inside a meter pit, the meter pit lid plug and bracket assembly comprising:
   a plug having a head and stem extending from the head;
   wherein the stem is configured to extend through a hole in a meter pit having a top surface;

wherein the head is sized to rest on the top surface of the meter pit lid and configured to hold the stem in the hole; and a bracket configured to hold the transmitter plug inside the meter pit;

wherein the bracket includes a base that is selectively fastenable to the stem;

wherein the bracket includes first and second arms that both extend and depend from opposing sides of the base;

wherein the bracket further includes a plate coupled to the first and second arms forming a space between the plate, arms and base;

wherein the plate is located opposite the base;

wherein the space is sized to receive a first portion of the transmitter plug;

wherein the plate includes a slot formed therein;

wherein the slot is sized to selectively receive a second portion of the transmitter plug; and wherein the stem is selectively engageable with the base so that when the stem is connected with the base, both the plug and bracket are configured to hold and suspend the transmitter plug inside the meter box.

2. The meter pit lid plug and bracket assembly of claim 1, wherein the plug head and bracket base are configured to sandwich the meter pit lid in between when the plug stem selectively fastens to the base.

3. The meter pit lid plug and bracket assembly of claim 1, further comprising a notch has an open end configured to receive the second portion of the transmitter plug by sliding the transmitter plug into the notch to rest on the plate surrounding the notch.

4. The meter pit lid plug and bracket assembly of claim 1, wherein the plug stem is threaded and the bracket base has a threaded hole disposed there through; and wherein the threaded stem is selectively engageable with the threaded hole of the base to fasten the plug and bracket together.

* * * * *